United States Patent [19]

Walters

[11] Patent Number: 4,811,924
[45] Date of Patent: Mar. 14, 1989

[54] VEHICLE SUPPORT STAND

[76] Inventor: Douglas L. Walters, Rte. 1, Otwell, Ind. 47564

[21] Appl. No.: 120,074

[22] Filed: Nov. 13, 1987

[51] Int. Cl.$^4$ .............................................. E04G 25/00
[52] U.S. Cl. .................. 248/352; 248/354.5; 254/11
[58] Field of Search ...................... 248/352, 410, 354.4, 248/354.1, 354.5, 354.6; 403/367, 369; 254/11

[56] References Cited

U.S. PATENT DOCUMENTS

| | | | |
|---|---|---|---|
| 1,894,293 | 1/1933 | Green | 248/352 |
| 2,238,297 | 4/1941 | Timm et al. | 248/410 |
| 2,356,941 | 8/1944 | Meyer | 248/352 |
| 2,439,854 | 4/1948 | Lipski | 248/352 |
| 3,348,799 | 10/1967 | Junkel et al. | 248/410 X |
| 3,374,011 | 3/1968 | Schipper | 403/377 X |
| 3,539,142 | 11/1970 | Morand | 248/410 X |
| 3,599,923 | 8/1971 | Hunnicutt | 248/352 |
| 4,540,147 | 9/1985 | Lincourt | 248/352 |

FOREIGN PATENT DOCUMENTS

| | | | |
|---|---|---|---|
| 711417 | 9/1931 | France | 248/352 |
| 1230843 | 5/1971 | United Kingdom | 248/410 |

Primary Examiner—J. Franklin Foss
Attorney, Agent, or Firm—Warren D. Flackbert

[57] ABSTRACT

A vehicle support stand utilizing a slidable spine member to maintain a vehicle at a desired preselected vertical position. The latter is positively achieved through the use of a control plate which serves a wedging relationship with respect to the spine member at a release position, and for the free vertical movement of the spine member at a manually controlled position. Spring means serve to continually urge the control plate into the aforesaid wedging relationship.

2 Claims, 1 Drawing Sheet

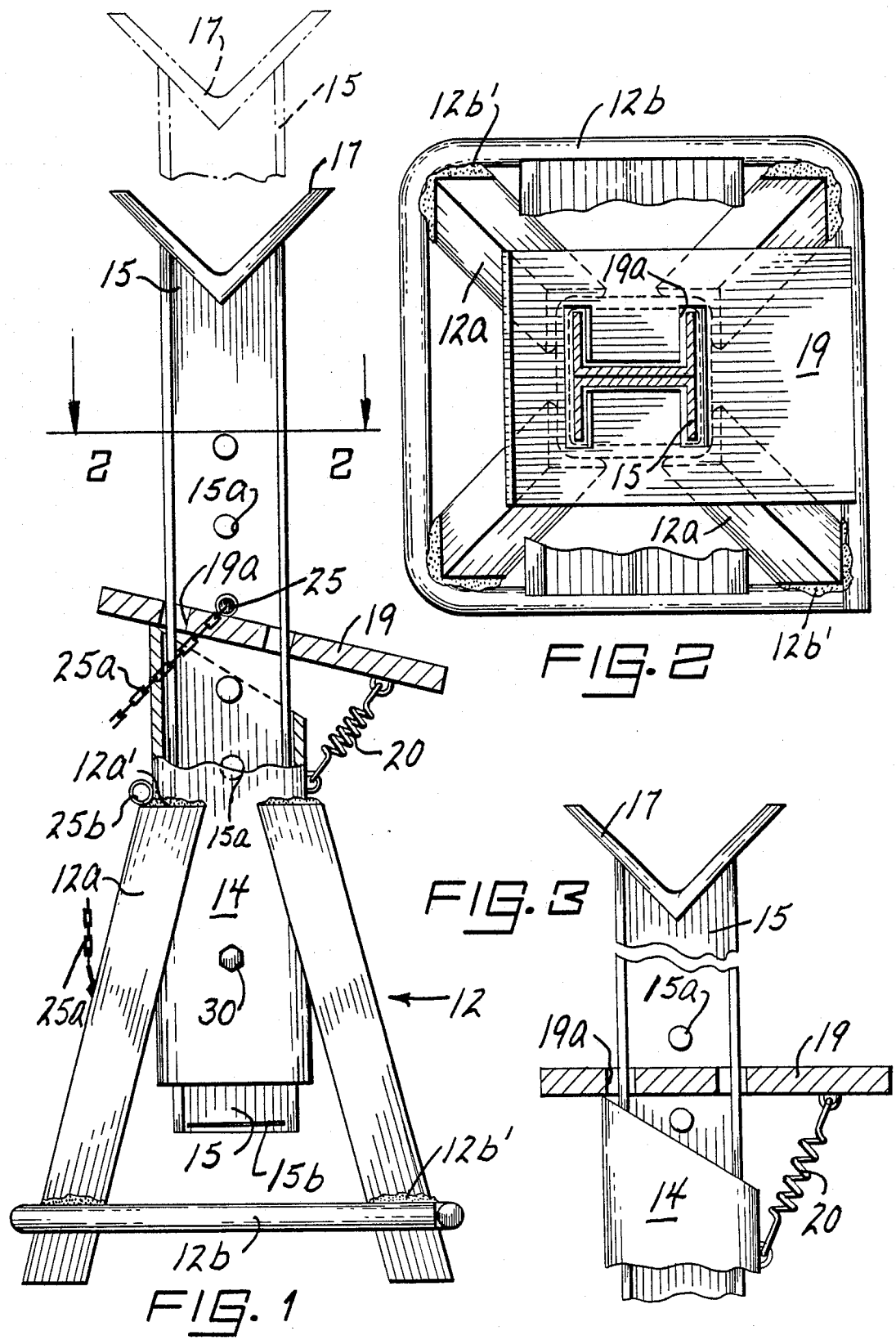

VEHICLE SUPPORT STAND

As is known, the repair and servicing of vehicles, such as automobiles, trucks and the like, oftentime requires such be accomplished at a raised and/or elevated position. Typically, such raising and/or elevating is achieved through a conventional mechanical jack, but, for safety reasons, among others, it would be preferable to maintain or hold the vehicle on independent stands, i.e. to release and/or prevent any possible malfunctioning occasioned by the jack. In other words, after the aforesaid raising/elevating action, a stand would be slid into position beneath the vehicle for holding purposes.

The invention satisfies the aforesaid need, i.e. presents an independent stand which is vertically adjustable to accommodate height requirements and, as well, includes provision for locking through selectively controlled wedging. Thus, the stand of the invention achieves vehicle/equipment holding at different but preselected levels.

BRIEF DESCRIPTION OF THE INVENTION

The support stand of the invention, which is primarily directed to vehicle usage, includes a base supporting a vertical sleeve, where the latter receives a slidable spine member which includes a specialized receiving portion at the upper end thereof. The slidable spine member is retained at a desired vertical position by a control plate continually urged into a wedging position with respect to the slidable spine member. The aforesaid wedging effect is caused by a spring member, where manual movement of the plate against the force of the spring member permits vertical adjustment of the spine member. In other words, ready vertical positioning is accomplished, with positive holding achieved, by hand releases of the control plate, at a preselected height.

DESCRIPTION OF THE FIGURES

In any event, a better understanding of the present invention will become more apparent from the following description, taken in conjunction with the accompanying drawing, wherein FIG. 1 is a view in side elevation, partly in vertical section and partly in phantom, showing a vehicle support stand in accordance with the teachings of the present invention;

FIG. 2 is a plan view, generally taken at line 2—2 on FIG. 1 and looking in the direction of the arrows, detailing the instant vehicle support stand; and, FIG. 3 is another view in side elevation, comparable to FIG. 1, but showing the control plate in a position releasing the spine member for vertical positioning.

For the purposes of promoting an understanding of the principles of the invention, references will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the vehicle support stand of the invention is defined by a base 12 including inwardly angling legs 12a which receive, as by welding at 12a', a sleeve 14, the latter having a downwardly angling top edge. Assembly of the legs 12a defining the base 12 is completed by a generally horizontal tubular member 12b, affixed, as by welding at 12b', to the legs 12a.

The sleeve 14 receives a vertically movable spine member 15, typically, in horizontal section, an I-beam or two back-to-back channel sections. The spine member 15 includes a downwardly angled receiving member 17 at its upper free end (see FIGS. 1 and 3).

The instant stand further includes a control plate 19 having a cut-out portion 19a through which the spine member 15 extends (see FIG. 2). One portion of the control plate 19 rests on a part of the top edge of the sleeve 14. The control plate 19 is continuously urged in a downward direction (see FIG. 1) by reason of a tension spring 20 which connects the undersurface of the control plate 19 and the outer surface of the sleeve 14. The control plate 19 serves a wedging relationship with respect to the spine member 15 to maintain the latter at a preselected vertical portion (to be described more fully herebelow).

The assembly is completed through the provision, in spine member 15, of a series of openings 15a into one of which a pin 25 (on chain 25a) is placed as an added precaution in the positioning of control plate 19. A cylinder 25b serves for pin 25 storage. Additionally, a set-bolt 30, cooperative with a portion 15b of spine member 15, serves to prevent any unwanted pull-out of the spine member 15 upon upward vertical movement of the latter.

In use, a vehicle, such as an automobile, is raised, as by a conventional mechanical jack (not shown). With the vehicle at a desired raised position, the support stand of the invention is slid thereunder, being vertically adjusted to be substituted for the jack (which will be removed). The vertical adjustment is achieved through moving the control plate 19 manually, to the position of FIG. 3, whereupon the spine member 15 can be raised or lowered, as needed. When the desired vertical height is attained, the control plate 19 is released, causing a wedging relationship between such and the spine member 15.

In other words, simple wedging action achieves positive vertical adjustment and placement, making for the ready adaptability and/or substitution of the instant vehicle support stand for the mechanical jack. Such a substitution achieves important safety for the user, in addition to freeing the jack for use at another job site. It should be evident, therefore, that the invention satisfies a significant need of the tradesmen.

The vehicle support stand described hereabove is susceptible to various changes within the spirit of the invention including, by way of example, in proportioning; the particular shape, in horizontal section, of the spine member; the manner of securement of the tension spring; the type of receiving member configuration on the upper end of the spine member; the shape and detail of the base; and, the like. Thus, the preceding should be considered illustrative and not as limiting the scope of the following claims.

I claim:

1. An equipment support stand comprising a base, a sleeve vertically mounted on said base, a spine member slidable in said sleeve and including a portion receiving said equipment, a control plate through which said spine member extends, said control plate engaging an upper edge portion of said sleeve in a pivotal relationship therewith, tension means connecting said control plate and said sleeve and continually urging said control plate into a wedged relationship with said spine member, where movement of said control plate away from said wedged relationship with said spine member serves release of said spine member for adjustment to a preselected height, where said spine member includes a series of spaced-apart vertically disposed openings, and where pin means selectively received in one of said openings immediately above said control plate blocks said control plate at said wedged relationship.

2. The equipment support stand of claim 1 wherein set-bolt means cooperative with said spine member serves a vertical movement restricting relationship with said spine member.

* * * * *